United States Patent [19]

Rakosky

[11] Patent Number: 4,704,294

[45] Date of Patent: Nov. 3, 1987

[54] DRY MIX COMPOSITION FOR HOME PREPARATION OF GRAVIES

[75] Inventor: Gayle E. Rakosky, Brunswick, Ohio

[73] Assignee: Durkee Famous Foods, Inc., Westlake, Ohio

[21] Appl. No.: 790,316

[22] Filed: Oct. 23, 1985

[51] Int. Cl.$^4$ .................... A23L 1/195; A23L 1/2165

[52] U.S. Cl. .................................. 426/578; 426/589; 426/453; 426/652

[58] Field of Search ................ 426/578, 589, 652, 453

[56] References Cited

U.S. PATENT DOCUMENTS

| | | | |
|---|---|---|---|
| 3,251,695 | 5/1966 | Gidlow et al. | 426/453 |
| 4,291,066 | 9/1981 | Anema et al. | 426/578 |
| 4,415,599 | 11/1983 | Bos | 426/579 |
| 4,418,090 | 11/1983 | Bohrmann | 426/589 |
| 4,472,448 | 9/1984 | Haggerty et al. | 426/589 |

Primary Examiner—Jeanette Hunter
Attorney, Agent, or Firm—Richard H. Thomas

[57] ABSTRACT

An agglomerated dry mix composition suitable for addition to a boiling or hot mixture of water and meat or poultry fat drippings to make a lump-free gravy, comprising a starch thickening agent in a thickening amount; a binding amount of a carbohydrate binding agent; flavoring and coloring amounts of a flavorant and colorant; and an emulsifying agent in an amount effective to emulsify the composition in water, said emulsifying agent comprising a blend of a protein source having a protein content of at least about 70% and a buffering agent in an amount effective to establish a pH of the composition in water in the range of about 6–7.

7 Claims, No Drawings

4,704,294

DRY MIX COMPOSITION FOR HOME PREPARATION OF GRAVIES

TECHNICAL FIELD

The present invention relates to a dry mix for use by a consumer in preparing home made gravies. The present invention is particularly adapted for addition to a boiling or hot mixture of water and meat or poultry drippings which are left in a skillet, broiler, or roasting pan after cooking. After dispersing the dry mix in the water and fat drippings, for instance by stirring, a thickened gravy product is produced which has good color and flavor attributes. On cooling to a temperature suitable for consumption, the thickened gravy product is free of lumps and shows no fat separation.

The present invention will be described with reference to pork, chicken and beef flavor types, although it will be apparent to those skilled in the art that the present invention is applicable to other flavor types, for instance, turkey.

BACKGROUND OF THE PRESENT INVENTION

U.S. Pat. No. 4,415,599, dated Nov. 15, 1983, to Kari E. O. Bos describes a dry mix composition which may be added directly to boiling water to form a sauce or gravy substantially free of lumps. The dry mix contains, as essential ingredients, a thickening agent such as starch or flour, and maltodextrin, with the mix containing a weight ratio of maltodextrin to thickening agent of at least 1:1.

This mix is totally different from the present invention in that it is not designed for addition to pan drippings, but rather to water only. There is no reference in the patent to the presence of pan drippings, nor to the problem of avoiding fat separation in a fat/water system, subjected to high heat and cooling. It should be noted that the product of the present invention can remain standing for a significant period, prior to actual consumption, at either a high or low temperature, without lumping or fat separation taking place.

The Bos patent makes reference to the use of a small amount of added fat. In Example 1 of the patent, 8% by weight fat is present in the dry mix, based on the weight of the dry mix. However, the dry mix is only about one-sixth (1/6) or less of the final gravy composition, the remainder being water. Thus in the final gravy, the fat content is less than about 1.2% by weight. By contrast, in the present invention, a typical ratio of ingredients in the final composition may be about 2 tablespoons of pan drippings per cup of water and about 3 tablespoons of dry mix. The pan drippings are about 50% fat, typically. This calculates out to a fat content of about 4% or more, much higher than the fat content in a gravy of the Bos patent, and typical of home flour-based gravies.

U.S. Pat. No. 4,418,090 to Bohrmann et al, dated 11/29/83, also describes a dry mix composition prepared for ultimate consumption by adding the mix to boiling water. The patent claims a specific thickening agent, namely a potato starch, said to have retarded thickening properties. An object is to permit direct addition to the mix to boiling water, the retarded thickening properties apparently giving improved dispersibility.

As with the Bos patent, there is no reference to addition of the mix to pan drippings, nor to solving the problem of fat separation.

It is known to use an organic emulsifier or combination of emulsifiers to stabilize fat/water emulsions. Many common organic emulsifiers were tried, in the development of the present invention, but unsuccessfully. They appeared to be incompatible in the mixture and form distinct two-phase systems with liquid at the top.

It is also known to stabilize oil-in-water emulsions using proteins, for instance casein, where the protein forms a substantially continuous phase film at the interface between the oil and water. However, in the present instance, even with intensive mixing, the use of proteins such as non-fat dry milk proved not to be successful.

Accordingly, it is an object in the present invention to provide a dry mix composition which not only has good lump-free dispersibility when added to water and pan drippings, but which also is free of fat separation, particularly through a prolonged heat cycle involving (a) heating to boiling water temperature and (b) cooling to consuming temperature.

BRIEF DESCRIPTION OF THE PRESENT INVENTION

The present invention resides in the discovery of an agglomerated dry mix composition suitable for addition to or use with a boiling mixture of water and meat or poultry fat drippings to make a lump-free gravy comprising: a starch thickening agent; a non-sweet, water soluble carbohydrate binding agent, preferably one having a dextrose equivalent less than about 20, present in an amount effective for preparation of an agglomerated product; an emulsifying amount of an emulsifying agent comprising a blend of a protein source and a buffering agent, the amount of buffering agent being that necessary to provide an emulsion pH in the range of about 6–7; and a flavoring amount of flavor. A preferred protein source is soy protein concentrate, preferably employed in an amount of about 4–7%, based on the weight of the dry mix composition.

In a preferred embodiment, the binding agent is maltodextrin. A preferred buffering agent is sodium tripolyphosphate.

In the following description, all percentages are percentages by weight, based on total composition weight, unless otherwise specified.

DETAILED DESCRIPTION OF THE PRESENT INVENTION

A necessary ingredient in the agglomerated composition of the present invention is a water-soluble starch thickening agent. Many starches have been employed as thickening agents in dry gravy and sauce mixes, including corn starch, potato starch, wheat starch, rice starch, tapiocca and waxy maize starches. All of these are satisfactorily employed in the composition of the present invention. Also, starch-containing materials such as cereal flours can be used as the thickening agent. Examples in this regard are wheat flour, potato flour, rice flour and the like.

It is known to use gums as thickening agents in gravy preparations. This is acceptable in the present instance in combination with the starches as the principal thickening agent. For example, water soluble gums such as xanthan gum and gum tragacanth and cellulose gums such as carboxymethylcellulose may be employed to reduce the amount of starch or flour used. However, they would be employed preferably in an amount less than about 5%, for instance about 3–5%.

The purpose of the thickening agent is to increase the viscosity of the product when reconstituted with water, and to provide body and texture to the reconstituted product. Broadly, the thickening agent is employed in a thickening amount, preferably about 15–40%, based on the weight of the dry mix composition. A more preferred range is about 25–35% starch.

In the practice of the present invention, optimum results have been achieved with the use of a potato starch, preferably a modified potato starch having retarded thickening properties such that immediate hydration does not occur. One such modified potato starch is sold by Avebe under the trademark Perfectamyl P10X-6%. This starch is classified as a distarch phosphate.

It is well known that if one simply adds starch or a base mix containing the same to a boiling liquid such as water or milk, the starch rapidly forms lumps that are difficult to disperse even with vigorous and long stirring. This is because upon contact with the hot liquid the outer portion of the starch clusters immediately gelatinize, and this "coating" of gelatinized starch forms a barrier against further water penetration into the clusters.

The use of a retarded thickening starch, such as potato starch, helps achieve dispersion of the starch before substantial thickening takes place. Accordingly, a sauce or gravy base containing such a starch as a thickening agent can be reconstituted for consumption by addition directly to boiling water with a lesser effort on the part of the consumer than would otherwise be required.

Another advantage of a potato starch is the ability of such starch to hold more water than other starches. Accordingly, a potato starch can be used in a lesser amount than would be necessary with other starches.

Another starch that has been successfully employed is one marketed by National Starch Co. under the trademark IF 131. This material is an instant tapiocca starch. Also, acceptable results have been obtained with such starches as modified corn starch, all purpose flour, and instantized wheat and barley flour.

A necessary ingredient in the formulation of the present invention is a highly water-soluble, non-sweet, carbohydrate binding agent, present in a binding amount necessary to prepare an agglomerated product. As will be described, the composition of the present invention comprises one or more fillers or bulking agents, an emulsifying agent, flavorants and colorants, in addition to the thickening agent. Improved dispersing properties are achieved by first processing these ingredients into an agglomerated state, wherein the carbohydrate binding agent functions as a binder for the other ingredients in the agglomerated particle.

It is important that the binding agent be highly water soluble. In other words, the binding agent should have sufficient solubility that it does not contribute significantly to the viscosity of the end gravy product when employed in a binding amount. Being highly water soluble, the binding agent in the agglomerated matrix also functions as a dispersant, readily dissolving when contacted with water, converting the matrix into a highly porous structure into which the water flows. This, in turn, results in rapid and enhanced hydration of the other particles, and is particularly useful with regard to the starch particles, minimizing the tendency of the starch particles to surface wet and lump before complete hydration can take place.

By the term "non-sweet", it is meant that the binding agent, when used in a binding amount, does not have a threshold or readily detectable level of sweetness in the end product of the present invention. For this purpose, the binding agent preferably has a dextrose equivalent less than about 20.

Examples of carbohydrate binding agents which are both highly water soluble and non-sweet are low D.E. hydrolyzed starches and the condensation polymers of certain sugars, such as dextrose (glucose) and maltose.

A preferred low D.E. hydrolyzed starch useful in the present invention is maltodextrin. Various methods of producing maltodextrins are known. Maltodextrins are identified by Chemical Abstract Registry No. 9050-36-6. Reference may also be had to U.S. Pat. No. 3,974,033 to Harjes et al, dated Aug. 10, 1976, under the prior art discussed therein. The maltodextrins useful herein have a low dextrose equivalent, preferably less than about 20. Generally, they are made by first liquifying native starch with an acid or enzyme to a DC less than about 20, followed by enzymatic conversion, e.g., with bacterial alpha-amylase (notice U.S. Pat. No. 3,849,194 and Reissue Pat. No. 30,880). As pointed out in the U.S. Pat. No. 3,974,033, maltodextrins are first prepared in syrup form and then spray dried to a moisture content of about 3.5% by weight. Also, the maltodextrin materials may be prepared from oxidized starch, as described in U.S. Pat. No. 3,974,033.

A suitable maltodextrin that may employed in the practice of the present invention is M-100, marketed under this trademark by Grain Processing Co.

The condensation polymers of the present invention broadly are prepared by the thermal condensation polymerization of monosaccharides in the presence of an acid and a polyol.

A preferred such polymer is polydextrose marketed by Pfizer, Inc. under this name. Polydextrose is a randomly bonded condensation polymer of dextrose, containing minor amounts of bound sorbitol and citric acid. It is assigned Chemical Abstracts Registry Number 68424-94-4, and is described in the publication "Chemistry of Foods and Beverages: Recent Developments", copyright 1982, Academic Press, Inc., in the chapter entitled "The Functional Applications of Polydextrose". This publication, as well as prior U.S. Pat. No. 3,766,165, which also describes polydextrose, are incorporated by reference herein. Maltose and other simple sugars can also be employed as the starting material in the polymerization process, in addition to dextrose.

Broadly, the amount of binding agent used is a binding amount, or that amount necessary to bind the other ingredients of the present composition into an agglomerated state. Agglomeration can be achieved with as little as about 15% by weight binding agent, and little advantage seems to be achieved in exceeding about 40% based on the weight of the total composition. Preferably, since the binding agent functions to provide a highly porous matrix or structure, on hydration, enhancing in particular the hydration of the starch thickening agent, it is used in an amount approximately equivalent to the amount of the thickening agent. A ratio of about 0.9 parts binding agent, plus or minus 0.05 parts, to about one part thickening agent functions well in all respects.

The composition of the prsent invention also preferably employs an amount of dry bulk filler or bulking agent such as lactose, nonfat dry milk, and whey. Broadly, the amount of filler or bulking agent employed is a bulking amount, since its use is dictated to a large extent by the requirements for forming an agglomerated particle. Functionally, with respect to preparation of a gravy, it is not critical ingredient. Good results are obtained with amounts from about zero up to about 15% filler, based on the weight of the total composition. Other fillers are well known. Examples of other fillers or bulking agents that can be employed are dry whole milk and buttermilk solids.

Similarly, the formulation of the present invention employs various flavorings and colorants, for instance, a chicken flavor and colorant to make a chicken gravy dry mix or a beef flavor and colorant to make a beef gravy dry mix. The amount of colorant can be varied to make a light or dark color system, depending upon personal preference. Similarly, the amount of flavor can be varied depending upon personal preference. A preferred flavorant is a hydrolyzed vegetable protein, such as that marketed by Nestle's under the trademark 3H3. This flavorant can be used at a level up to about 10%, based on total composition weight.

A critical ingredient in the composition of the present invention is an emulsifying agent comprising the combination of a protein source with a food grade buffering agent. The emulsifying agent substantially increases dispersibility of the composition and inhibits fat separation well above and beyond that obtainable with the starch and maltodextrin alone.

It is well known that oil-in-water emulsions can be stabilized by proteins by absorption of the protein water soluble phase onto the fat globule surface. The presence of protein molecules at the oil/water interface tends to reduce cohesive forces. In the present instance, it was found that this phenomena was substantially enhanced by the use of a protein source having a high protein concentration, in combination with a pH adjusting agent.

It is important that the protein source be high in protein content, preferably at least about 70% protein, and also water dispersible. A preferred protein source meeting these criteria, and having emulsifying and stabilizing properties, is a vegetable protein, such as soy protein concentrate, marketed under the trademark Promax 70 L by Griffith Laboratory. Examples of other high protein sources that can be employed are a vegetable protein isolate, such as soy protein isolate, a casein such as sodium caseinate, and a whey protein concentrate.

A preferred pH adjusting agent is a phosphate such as sodium tripolyphosphate. A food grade sodium tripolyphosphate that can be employed is one marketed by Stauffer Chemicals under the trademark Curafos. This material has a particle size typical that all passes through a 40 sieve and 90% through a 100 sieve. It is marketed in the form of a white granular material essentially free of caking. In a water solution, it provides a pH, typically, of about 9.8. When dissolved in water, it provides a colorless appearance and leaves about only 0.1% water insolubles. Its bulk density is about 50 lbs/cubic foot. Typically, food grade sodium tripolyphosphate is used for curing of hams and bacon.

Broadly, the amount of emulsifying agent used is an emulsifying amount, or that necessary to prevent fat separation under the conditions of use of the composition of the present invention. The principal ingredient of the emulsifying agent weightwise is the protein hydrocolloid with the amount of buffering agent being that necessary to obtain a solution pH of about 6-7 when the composition of the present invention is fully dispersed in water. A preferred weight range for the protein source is about 4-7%. Normally, about 0.25-2% sodium tripolyphosphate will provide a pH in the range of 6-7.

Both percentage ranges are based on total composition weight, dry basis.

Although not intended to be bound by theory, it is believed that the sodium tripolyphosphate assists in the release of the water soluble phase of the protein and that this, in combination with the high protein concentration of the soy protein concentrate, forms a better protective colloid film than would otherwise be the case with the use of low protein source hydrocolloids.

The agglomeration step of the present invention can be carried out using any conventional agglomeration procedure. A preferred procedure is fluid bed agglomeration, in which the dry ingredients are simply added into the bottom of the fluidizing chamber in the proportions desired. Warm air is then introduced through the chamber bottom to fluidize the ingredients and form the bed, and steam or hot water is sprayed into the bed to moisten the maltodextrin and starch particles a sufficient amount to cause them to stick together or agglomerate. When the desired amount of agglomeration has taken place, the water or steam is turned off and the fluidizing air is increased in temperature a sufficient amount to cause the agglomerates or particles to dry.

A particular spray agglomerator that can be employed is one marketed by Glatt Air Techniques, Inc., Model GPCG. A similar apparatus is marketed by Aeromatic, Inc. of Bernardsville, NJ. In this type of apparatus, air is introduced into the fluid bed chamber through an air distribution plate at the bottom of the chamber at a temperature of about 35°-75° C. The steam or hot water is introduced through a nozzle into the bed at a temperature of about 50°-70° C., and agglomeration is carried out for a sufficient period of time to achieve a particle size such that at least 90% is minus 60 plus 120, U.S. Standard Sieve.

An alternative agglomerator that can be employed is one marketed by Blaw-Knox Food and Chemical Equipment, Inc. under the trademark Buflovak Instantizer. In this process, also, steam or water is introduced into a contacting chamber to moisten particles in the chamber. The moistened particles then pass through an air turbulence zone, where they are combined into clusters. This is followed by drying, cooling and screening.

In the following Examples, all weights are weight percent, based on total composition, unless otherwise specified.

EXAMPLE 1

The following formulation provided a dry mix composition suitable for reconstitution with water to produce a chicken gravy.

| Ingredients | Weight Percent |
|---|---|
| Potato starch, Perfectamyl P-10-X-6%, AVEBE | 35.00 |
| Maltodextrin, M-100 | 31.00 |
| Lactose 305, Foremost | 9.57 |
| Hydrolyzed vegetable protein, 3H3, Nestle' | 7.00 |
| Salt, fine prepared flour | 6.50 |
| Soy protein concentrate, Promax 70L, Griffith | 5.00 |
| Sodium Tripolyphosphate, Curafos STP, Stauffer | 2.00 |
| Nonfat dry milk, Superheat, Land O' Lakes | 2.00 |

| Ingredients | Weight Percent |
| --- | --- |
| Sodium citrate | 0.25 |
| Flavor and color | Balance |
| | 100.00 |

In the above formulation, the lactose and non-fat dry milk are simply bulk fillers in the formulation. The function of the hydrolyzed vegetable protein is to add flavor to the composition.

The purpose of the sodium citrate is to assist in relaxing the protein and buffering the system. Normally, it is used in the amount of about 0.1 to 0.5% based on total composition weight.

The dry mix was prepared by agglomeration using the spray agglomerator marketed by Glatt Air Techniques, Inc., Model GPCG.

In use, about 3 tablespoons of the dry mix were dispersed in a boiling mixture of 1 cup of water and 2 tablespoons of meat drippings to produce a gravy. On reconstitution, no lumping or fat separation was observed, even after prolonged standing. Dispersion of the ingredients was achieved with minimum stirring and effort.

I claim:

1. An agglomerated dry mix composition suitable for addition to a boiling or hot mixture of water and meat or poultry fat drippings to make a lump-free gravy, comprising
   a retarded, potato starch thickening agent in a thickening amount;
   a binding amount of a maltodextrin;
   flavoring and coloring amounts of a flavorant and colorant; and
   an emulsifying agent in an amount effective to emulsify the composition in water, said emulsifying agent comprising a blend of a protein source having a protein content of at least about 70% and a buffering agent in an amount effective to establish a pH of the composition in water in the range of about 6–7.

2. The composition of claim 1 wherein said protein source is soy protein concentrate.

3. An agglomerated dry mix composition suitable for addition to a mixture of water and meat or poultry fat drippings to make a lump-free gravy, comprising
   about 15–40% retarded, potato starch thickening agent;
   maltodextrin having a dextrose equivalent less than about 20, the ratio of maltodextrin to starch thickening agent being in the range of about 0.85:1 to 0.95:1.0;
   a flavoring amount of flavor and a coloring amount of color; and
   an emulsifier dispersing agent comprising a blend of about 4–7% soy protein concentrate and a buffering agent in an amount effective to establish a pH of the composition in water of about 6–7.

4. The composition of claim 3 wherein said buffering agent is sodium tripolyphosphate.

5. The composition of claim 3 agglomerated in a fluid bed apparatus.

6. The composition of claim 5 having a particle size such that 90% is greater than 120 mesh and less than 60 mesh, U.S. Standard Sieve.

7. A method for making lump-free gravy from meat or poultry fat drippings comprising the steps of
   (a) adding water to said drippings and bringing the drippings to a boil;
   (b) reducing the heat under said drippings and introducing into said drippings an agglomerated dry mix composition comprising
      (i) a retarded, potato starch thickening agent in a thickening amount;
      (ii) a binding amount of a maltodextrin;
      (iii) flavoring and coloring amounts of a flavorant and colorant; and
      (iv) an emulsifying agent in an amount effective to emulsify the composition in water, said emulsifying agent comprising a blend of a protein source having a protein content of at least 70% and a buffering agent in an amount effective to establish a pH of the composition in water in the range of about 6–7; and
   (c) mixing together said water, drippings and dry mix until a homogeneous gravy is obtained.

* * * * *